United States Patent
Leng (10) Patent No.: US 9,262,976 B2
(45) Date of Patent: Feb. 16, 2016

(54) CHIP ON GLASS TYPE LIQUID CRYSTAL DISPLAY

(75) Inventor: Changlin Leng, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 562 days.

(21) Appl. No.: 13/499,346

(22) PCT Filed: Apr. 21, 2011

(86) PCT No.: PCT/CN2011/073134
§ 371 (c)(1),
(2), (4) Date: Mar. 30, 2012

(87) PCT Pub. No.: WO2011/131139
PCT Pub. Date: Oct. 27, 2011

(65) Prior Publication Data
US 2012/0188223 A1   Jul. 26, 2012

(30) Foreign Application Priority Data

Apr. 22, 2010   (CN) .......................... 2010 1 0156379

(51) Int. Cl.
G09G 3/20     (2006.01)
G09G 3/36     (2006.01)
G02F 1/1345   (2006.01)

(52) U.S. Cl.
CPC .......... *G09G 3/3648* (2013.01); *G02F 1/13452* (2013.01); *G09G 2300/0408* (2013.01); *G09G 2300/0426* (2013.01); *G09G 2320/0223* (2013.01); *G09G 2330/02* (2013.01); *G09G 2370/08* (2013.01)

(58) Field of Classification Search
CPC .............. G02F 1/13452; G02F 3/3648; G02F 2300/0405; G02F 2370/08; G02F 2320/0223; G02F 2330/02; G02F 2300/0426
See application file for complete search history.

(56) References Cited

U.S. PATENT DOCUMENTS

| 2003/0058208 A1 | 3/2003 | Kawamura et al. |
| 2003/0169250 A1* | 9/2003 | Kimura .......................... 345/212 |
| 2004/0085270 A1* | 5/2004 | Kimura ............................ 345/82 |

(Continued)

FOREIGN PATENT DOCUMENTS

| CM | 1682264 A | 10/2005 |
| CN | 1499272 A | 5/2004 |

(Continued)

OTHER PUBLICATIONS

Extended European Search Report dated Jan. 14, 2013; Appln. No. 11771592.0-2205/ 2472313 PCT/CN2011073134.

(Continued)

*Primary Examiner* — Ariel Balaoing
(74) *Attorney, Agent, or Firm* — Ladas & Parry LLP (57) ABSTRACT

A chip on glass (COG) type liquid crystal display comprises: a glass substrate (3); two or more than two driving circuits, which are provided on the glass substrate (3) and are connected one another in series; a constant current source (9), which is separately connected to at least one of the two or more than two driving circuits to supply a constant current signal to each driving circuit; and converting circuits (8), which are provided in each driving circuit to convert the constant current signal received to a voltage signal.

18 Claims, 4 Drawing Sheets

(56) References Cited

U.S. PATENT DOCUMENTS

| | | | |
|---|---|---|---|
| 2004/0242171 A1 | 12/2004 | Hosokawa et al. | |
| 2005/0052442 A1 | 3/2005 | Takenaka et al. | |
| 2005/0073513 A1 | 4/2005 | Date | |
| 2006/0017664 A1 | 1/2006 | Takagi et al. | |
| 2006/0038501 A1* | 2/2006 | Koyama et al. | 315/169.3 |
| 2006/0192738 A1* | 8/2006 | Kawamura et al. | 345/89 |
| 2006/0244711 A1 | 11/2006 | Kim | |
| 2008/0024475 A1* | 1/2008 | Takenaka et al. | 345/206 |
| 2008/0049170 A1 | 2/2008 | Hwang et al. | |
| 2008/0278280 A1 | 11/2008 | Alexeyev | |
| 2010/0001659 A1* | 1/2010 | Inoue | 315/291 |

FOREIGN PATENT DOCUMENTS

| | | |
|---|---|---|
| CN | 1940658 A | 4/2007 |
| CN | 101097704 A | 1/2008 |
| CN | 101312003 A | 11/2008 |
| CN | 101354877 A | 1/2009 |
| CN | 101425281 A | 5/2009 |
| JP | 60-190011 A | 9/1985 |
| JP | 04-204817 A | 7/1992 |
| JP | 09-105906 A | 4/1997 |
| JP | 2003-107423 A | 4/2003 |
| JP | 2004-198770 A | 7/2004 |
| JP | 2004-354567 A | 12/2004 |
| JP | 2004-357004 A | 12/2004 |
| JP | 2005-062582 A | 3/2005 |
| JP | 2005-094214 A | 4/2005 |
| JP | 2006-091860 A | 4/2006 |
| JP | 2009-244885 A | 10/2009 |
| JP | 2010-016198 A | 1/2010 |
| KR | 1999-015788 A | 3/1999 |
| KR | 1020020026862 A | 4/2002 |
| KR | 20070116903 A | 12/2007 |
| KR | 100917971 B1 | 9/2009 |

OTHER PUBLICATIONS

International Search Report: mailed Aug. 4, 2011; PCT/CN2011/073134.
KIPO OA dated Aug. 26, 2013; Appln. No. 10-2012-7009721.
Japanese Office Action dated Feb. 9, 2015; Appln. No. 2013-505325.
Japanese Office Action dated Oct. 23, 2015; Appln. No. 2013-505325.

* cited by examiner

CHIP ON GLASS TYPE LIQUID CRYSTAL DISPLAY

TECHNICAL FIELD

Embodiments of the present invention relate to a chip-on-glass base type liquid crystal display (LCD).

BACKGROUND

A liquid crystal display array substrate comprises a plurality of gate lines and a plurality of data lines, each of the gate lines is provided with driving signals by a gate driving circuit, and each of the data lines is provided with driving signals by a source driving circuit. The gate driving circuit and the source driving circuit generally are integrated circuits (or ICs). As such, the gate driving circuit is also referred to as a gate driving IC, while the source driving circuit is also referred to as a source driving IC.

The gate driving circuit and the source driving circuit are provided in two ways, one of which is to provide the driving circuits on a flexible film thereby achieving a chip-on-film (COF) structure, while the other is to provide the driving circuits directly on a glass substrate to achieve a chip-on-glass (COG) structure. The COG base type liquid crystal displays are referred to as chip-on-glass base type crystal liquid displays in this description.

Figure 1:
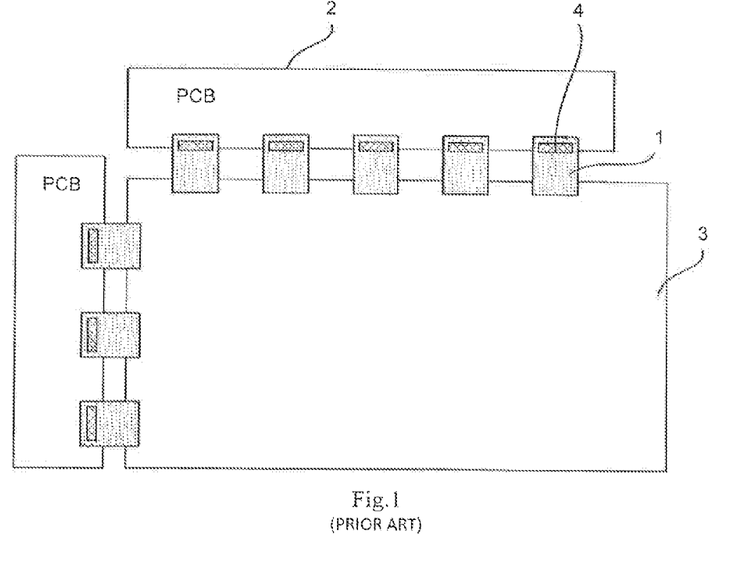
FIG. 1 is a schematic structural view of a conventional COF type liquid crystal display.

FIG. 1 shows a schematic structural view of a conventional COF type liquid crystal display. A flexible printed circuit (FPC) board 1 is connected to a printed circuit board (PCB) 2 and a glass substrate 3 with a chip 4 provided on the FPC 1.

Figure 2:
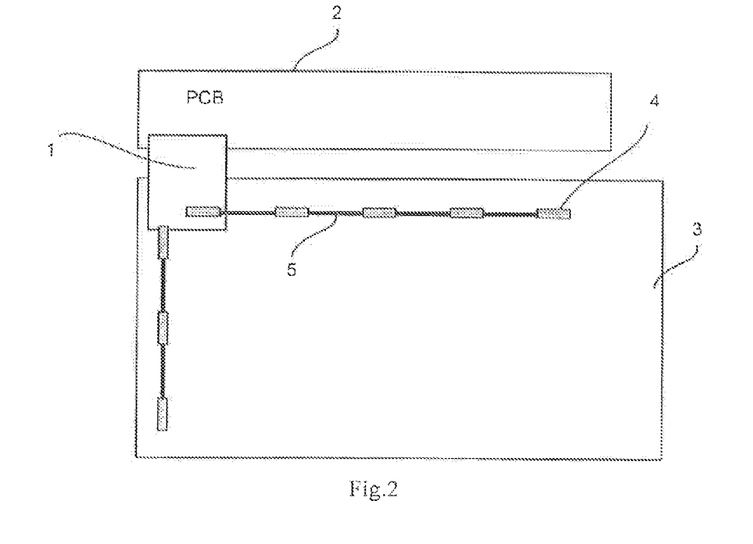
FIG. 2 is a structural view of a conventional COG base type liquid crystal display.

A schematic structural view of a conventional COG base type liquid crystal display is shown in FIG. 2. An FPC 1 is connected to a PCB 2 and a glass substrate 3 with a chip 4 provided on the FPC 1. The chips in FIG. 1 and FIG. 2 include gate driving circuits and source driving circuits, e.g., the chips 4 provided along the x direction (i.e., the horizontal direction) of the glass substrate are source driving circuits, while the chips 4 provided along the y direction (i.e., the vertical direction) of the glass substrate are gate driving circuits.

For the liquid crystal displays as shown in FIG. 2, FBC 2 provides driving signals to each chip 4 through FPC 1. Taking source driving circuits for example, all source driving circuits are connected in series to from a series circuit; a source driving circuit connected to FPC 1 receives voltage signals and then transmits the voltage signals to the next source driving circuit. All source driving circuits are connected through a screen wire 5 provided on the glass substrate 3, the screen wire 5 is a wire on array (WOA) with certain resistance. When a source driving circuit transmits voltage signals to the next source driving circuit, values of the voltages transmitted to the next source driving circuit drop due to the existence of the screen wire 5. When the voltage signals are continuously transmitted to other source driving circuits in the series circuit, values of the voltages continue to drop, such that values of the voltages transmitted to one or more source driving circuits in the end of the series circuit may not meet the requirements, thereby failing to drive the source driving circuits.

Similarly, all gate driving circuits are connected in series to form a series circuit; a gate driving circuit connected to FPC 1 receives voltage signals and then transmits the voltage signals to the next adjacent gate driving circuit. As such, there are similar issues in the gate driving circuits.

SUMMARY

An embodiment of the present invention provides a COG base type liquid crystal display. The COG base type liquid display comprises: a glass substrate; two or more driving circuits provided on the glass substrate and connected to each other; a constant current source, connected to at least one of the two or more driving circuits to provide constant current signals to each of the driving circuits; a converter circuit provided in each of the driving circuits, to convert the constant current signals received into voltage signals.

BRIEF DESCRIPTION OF THE DRAWINGS

Following are brief descriptions about the accompany drawings used in the descriptions about the embodiments or state-of-art, to better explain the aspects of the embodiments of the present invention or current art. Apparently, the accompany drawings below are merely samples of the present invention; those skilled in the art may contemplate other drawings according to these drawings without creative works.

DETAILED DESCRIPTION OF EMBODIMENTS

Embodiments of the present invention are described clearly in whole in conjunction with the accompany drawings to better illustrate the objects, aspects and advantages thereof. It is apparent that the described embodiments are merely a part, instead of all possible embodiments. Based on the embodiments of the present invention, other embodiments that may be contemplated by those ordinary skilled in the art with out creative works shall fall into the scope of the present invention.

Figure 3:
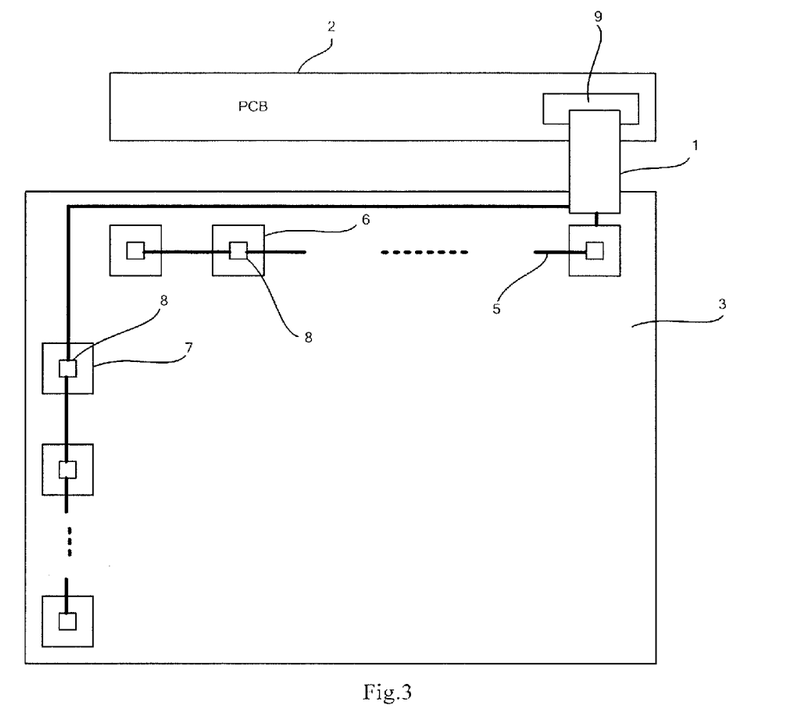
FIG. 3 is a structural view of a COG base type liquid crystal display according to the embodiments of the present invention.

A structural view of a COG base type liquid crystal display according to the embodiments of the present invention is shown in FIG. 3. As shown in FIG. 3, the liquid crystal display comprises two or more source driving circuits 6 and two or more gate driving circuits 7. The source driving circuits 6 and the gate driving circuits 7 are all exemplary circuits provided on a glass substrate 3. The glass substrate 3 is a substrate for forming an array substrate. For example, the source driving circuits 6 and the gate driving circuits 7 may be provided on the glass substrate 3 by welding. Furthermore, for example, the source driving circuits 6 and the gate driving circuits 7 may be provided on the glass substrate 3 with a metal paste. All source driving circuits 6 are connected in series; similarly, all gate driving circuits 7 are connected in series. According to an embodiment of the present invention, the circuit formed by all source driving circuit 6 connected in series is refereed to, for example, as a first series circuit, while the circuit formed by all gate driving circuits 7 connected in series is referred to, for example, as a second series circuit. The liquid crystal display further comprises a constant current source 9. The constant current source 9 is connected to at least one of two or more source driving circuits 6 and at least one of two or more gate driving circuits 7, for providing constant current signals to each of the source driving circuits 6 and each of the gate driving circuits 7.

As shown in FIG. 3, the constant current source 9 is provided on a PCB 2. Nevertheless, it should be noted that the constant current source 9 may also be provided separately or provided on another circuit board other than the PCB 2. Furthermore, as shown in FIG. 3, the constant current source 9 is connected to the gate driving circuits and the source driving circuits through a FPC 1. However, it also should be noted that, the constant current source 9 may be connected to the gate driving circuits and the source driving circuits directly, or connected to the gate driving circuits and the source driving circuits through any medium other than the FPC 1. Also, the liquid crystal display may comprise converter circuits 8 provided in each of the source driving circuits 6 and each of the gate driving circuits 7. The converter circuit 8 is used to convert the constant current signals received into voltage signals. The converter circuits 8 in each of the source driving circuits 6 are connected in parallel; similarly, the converter circuits 8 in each of the gate driving circuits 7 are connected in parallel.

As shown in FIG. 3, the source driving circuits 6 and the gate driving circuits 7 are all connected to the constant current source 9 and under its control; however, in another embodiment, one of them may be connected to the constant current source 9 and under its control, while the other may be connected in a conventional manner.

The differences between a liquid crystal display according to the embodiment of the present invention and a conventional liquid crystal display lie in that: a conventional liquid crystal display provides voltage signals to each of the source driving circuits and each of the gate driving circuits through a device generating voltage signals; while in the embodiments of the present invention, the liquid crystal display comprises a constant current source and converter circuits provided in each of the source driving circuits and each of the gate driving circuits converting the current signals from the constant current source into voltage signals, and thus providing voltage signals to each of the source driving circuits and each of the gate driving circuits.

In an liquid crystal display according to an embodiment of the present invention, the constant current sources are connected to at least one of the source driving circuits and at least one of the gate driving circuits, and the source driving circuits and the gate driving circuits are all connected through a screen wire. As such, current signals, instead of voltage signals, are transmitted between the source driving circuits and the gate driving circuits, such that the resistance of the screen wire can not affect the current signals, the current values of the current signals received by each of the source driving circuits and each of the gate driving circuits are equal. As the converter circuits convert the current signals received into voltage signals, it is ensured that there are no attenuations of the voltages provided to each of the source driving circuits and each of the gate driving circuits. It is thus possible to simplify the manufacturing processes without requiring to precisely control sizes of the screen wires.

In addition, it is only required to provide a converter circuit in each of the source driving circuits and each of the gate driving circuits to convert the constant current signals received into voltage signals, thereby simplifying the manufacturing processes without requiring to precisely controlling sizes of the screen wires.

In the liquid crystal displays according to the embodiments of the present invention, constant current sources are used to provide constant current signals to each of the gate driving circuits and each of the gate driving circuits, thereby the current values of the current signals received by each of the gate driving circuits and each of the gate driving circuits can not be affected, despite of long screen wires and thereby relatively larger voltage drops. As such, the performances of such liquid crystal displays are improved with no power increases and heat increases of the driving circuits due to long screen wires.

Furthermore, conventionally, in case of transmitting voltage signals using screen wires, the resistances of the screen wires may be relatively larger with smaller diameters, thereby leading to relatively larger voltage drops due to the screen wires. In that regard, the conventional screen wires are usually of larger diameters, occupying more spaces. In the embodiment of the present invention, the diameters of the screen wires transmitting the constant current signals may be relatively smaller, and the current signals transmitted to each of the source driving circuits and each of the gate driving circuits are equal despite of smaller diameters of the screen wires, and the spaces occupied by screen wires may be decreased accordingly.

Figure 4:
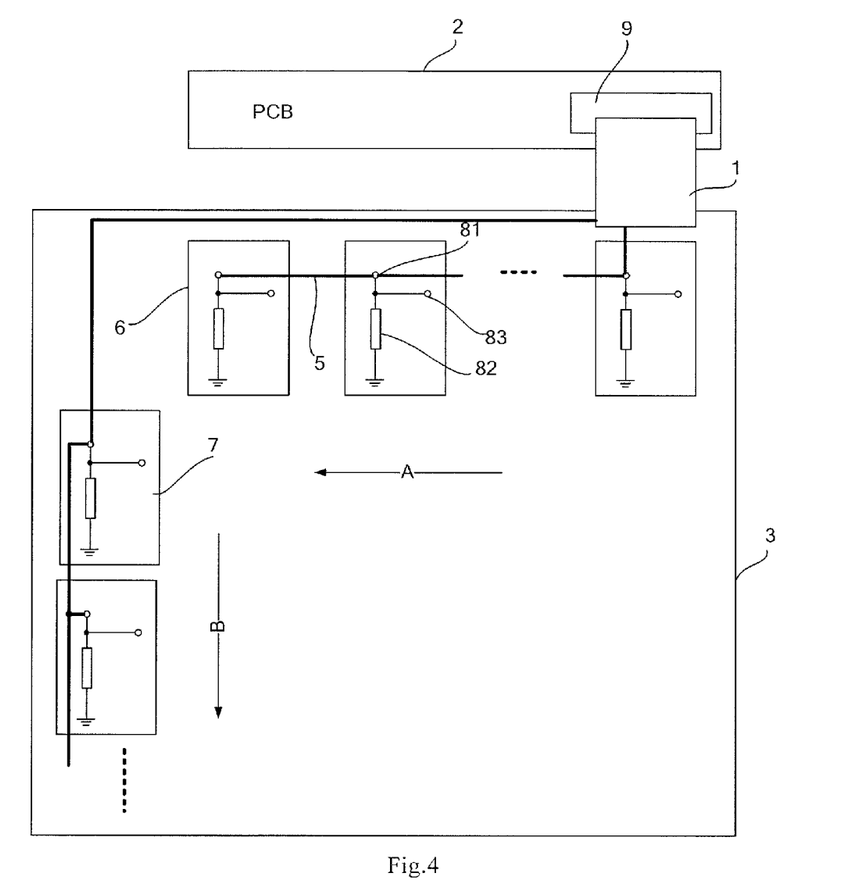
FIG. 4 is a schematic view of an exemplary structure of a COG base type liquid crystal display according to the embodiments of the present invention.

A schematic drawing of an exemplary structure of a COG base type liquid crystal display according to an embodiment of the present invention is shown in FIG. 4. As shown in FIG. 4, in such a liquid crystal display, each of the exemplary converter circuits 8 comprises an input terminal 81, a resistor 82 and an output terminal 83. The input terminal 81 is used to receive constant current signals. One end of the resistor 82 is connected to the input terminal 81, and the other end is grounded. The output terminal 83 is connected to the input terminal 81 and the end of the resistor 82 that is connected to the input terminal 81, to output terminal voltage signals. Furthermore, as shown in FIG. 4, the constant current source 9 is provided on the PCB 2, and the constant current source 9 is connected to the gate driving circuits and the source driving circuits through the FPC 1. However, it should be noted that, similar to the description with reference to FIG. 3, in this embodiment, the constant current source 9 may be provided separately or provided on a circuit board other than the PCB 2, and the constant current source 9 may be connected to the gate driving circuits and the source driving circuits directly, or through any medium other than the FPC 1.

As shown in FIG. 4, the input terminal of the converter circuit in the source driving circuit connected to the constant current source is connected to the constant current source; other than the source driving circuit connected to the constant current source, the input terminal of the converter circuit in each of the remaining source driving circuits is connected to the input terminal of the converter circuit of the respective previous source driving circuit in the first series circuit.

Similarly, the input terminal of the converter circuit in the gate driving circuit connected to the constant current source is connected to the constant current source; other than the gate driving circuit connected to the constant current source, the input terminal of the converter circuit in each of the remaining gate driving circuits is connected to the input terminal of the converter circuit in the respective previous gate driving circuit in the second series circuit.

In the embodiments of the present invention, the order of the next one and the previous one of adjacent source driving circuits in the series circuit is based on the flow direction of the current signals in the series circuit. With reference to FIG. 4, if the flow direction of the current signals in the first series circuit formed by the source driving circuits is indicted by an arrow A, the next adjacent source driving circuit of a certain source driving circuit is the adjacent source driving circuit, to which the current signals outputted by the source driving circuit flow next. In the second series circuit, similarly, the concept of the next gate driving circuit and the previous gate driving circuit is also based on the flow direction of the current signals.

As shown in FIG. 4, the constant current source 9 is connected to the rightmost source driving circuit on the array substrate, while each of the remaining source driving circuits is connected to the rightmost source driving circuit in series. The flow direction of the constant current signals in the first series circuit in FIG. 4 is indicted by the arrow A.

Also, the constant current source 9 is connected to the upmost gate driving circuit on the array substrate, while each of the remaining gate driving circuits is connected to the upmost gate driving circuit in series. The flow direction of the constant current signals in the second series circuit in FIG. 4 is indicted by the arrow B.

As shown in FIG. 4, the constant current source 9 is connected to a source driving circuit and a gate driving circuit respectively, forming a first series circuit with the current flow direction A and a second series circuit with the current flow direction B.

If the constant current source 9 is connected to two or more source driving circuits, and two or more gate driving circuits, two or more first series circuits and second series circuits can be formed.

Figure 5:
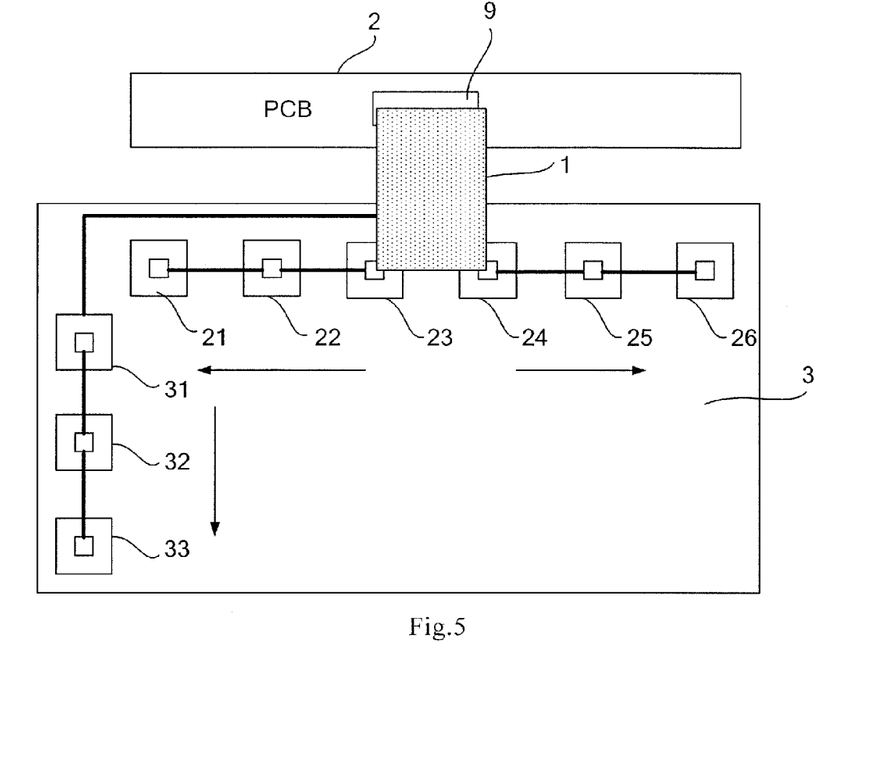
FIG. 5 is a schematic view of another exemplary structure of a COG base type liquid crystal display according to the embodiments of the present invention.

FIG. 5 is a schematic view of another exemplary structure of a COG base type liquid crystal display according to an embodiment of the present invention. For the purpose of simplification, only six source driving circuits and three gate driving circuits are shown in this embodiment; the six source driving circuits are a first source driving circuit 21, a second source driving circuit 22, a third source driving circuit 23, a fourth source driving circuit 24, a fifth source driving circuit 25 and a sixth source driving circuit, respectively. The three gate driving circuits are a first gate driving circuit 31, a second gate driving circuit 32 and a third driving circuit 33, respectively. In the present embodiment, the constant current source 9 in the middle of the array substrate is connected to two source driving circuits through the FPC 1, i.e., the third source driving circuit 23 and the fourth source driving circuit 24 respectively, and also connected to an upmost gate driving circuit, i.e., the first gate driving circuit 31. Also, as shown in FIG. 5, a constant current source 9 is provided on a PCB 2, and the constant current source is connected to the gate driving circuits and the source driving circuits through FPC 1. However, it should be noted that, similar to the description with reference to FIG. 3, in this embodiment, the constant current source 9 may be provided separately or provided on a circuit board other than PCB 2, and the constant current source 9 may be connected to the gate driving circuits and the source driving circuits directly, or through any medium other than FPC 1.

In this embodiment, the third source driving circuit 23, the second source driving circuit 22 and the first source driving circuit 21 form a first series circuit, and the flow direction of the current signals in the first series circuit is: from the third source driving circuit 23 to the second source driving circuit 22, and further to the first source driving circuit 21. The input terminal (not shown in FIG. 5) of the converter circuit in the third source driving circuit 23 is connected to the constant current source 9, and the input terminal of the second source driving circuit 22 is connected to the input terminal of the converter circuit in the third source driving circuit 23, and the input terminal of the first source driving 21 is connected to the input terminal of the converter circuit in the second source driving circuit 22.

In this embodiment, the fourth source driving circuit 24, the fifth source driving circuit 25 and the sixth source driving circuit 26 form another first series circuit, and the flow direction of the current signals in the first series circuit is: from the fourth source driving circuit 24 to the fifth source driving circuit 25, and further to the sixth source driving circuit 26. The input terminal of the converter circuit in the fourth source driving circuit 24 is connected to the constant current source 9, and the input terminal of the fifth source driving circuit 25 is connected to the input terminal of the converter circuit in the fourth source driving circuit 24, and the input terminal of the six source driving 26 is connected to the input terminal of the converter circuit in the fifth source driving circuit 25.

The first gate driving circuit 31, the second gate driving circuit 32 and the third gate driving circuit 33 form a second series circuit, and the flow direction of the current signals in the second series circuit is: from the first gate driving circuit 31 to the second gate driving circuit 32, and further to the third gate driving circuit 33. The input terminal of the converter circuit in the first gate driving circuit 31 is connected to the constant current source 9, and the input terminal of the second gate driving circuit 32 is connected to the input terminal of the converter circuit in the first gate driving circuit 31, and the input terminal of the third gate driving 33 is connected to the input terminal of the converter circuit in the second gate driving circuit 32.

In such a manner, in the liquid crystal displays according to the embodiment of the present invention, two or more source driving circuits form at least one first series circuit. In the at least one first series circuit, the input terminal of the converter circuit in the source driving circuit that is connected to the constant current source is connected to the constant current source; other than the source driving circuit connected to the constant current source, the input terminal of the converter circuit of each of the remaining source driving circuits is connected to the input terminal of the converter circuit in the respective previous adjacent source driving circuit in the first series circuit.

Similarly, two or more gate circuits form at least one second series circuit. In the at least one second series circuit, the input terminal of the converter circuit in the gate driving circuit that is connected to the constant current source is connected to the constant current source; other than the gate driving circuit connected to the constant current source, the input terminal of the converter circuit of each of the remaining gate driving circuit is connected to the input terminal of the converter circuit in the respective previous adjacent gate driving circuit in the second series circuit.

In the embodiment of the present invention, the constant current source is connected to the FPC, while the FPC is connected to at least one of the two or more source driving circuits and to at least one of the two or more gate driving circuits; in other words, the constant current source is connected to at least one source driving circuit and at least one gate driving circuit through the FPC. Also, the FPC may, for example, be connected to the at least one source driving circuit and the at least one gate driving circuit through anisotropic conductive adhesive.

In the embodiment according to the present invention, the driving voltage of each of the driving circuits may be predetermined, the resistance of the resistor in each of the driving circuits may be equal or not; the resistance of the resistor in each of the converter circuit may also be predetermined, such that the current value on the resistor in each of the converter circuit may be determined, and the current value of the constant current source is a sum of the current values on the resistors of the converter circuits, in other words, the current value of the constant current source equals to the sum of the ratios between the driving voltages of the driving circuits and the corresponding resistance of the driving circuits.

In the embodiment according to the present invention, the constant current source may be an analog power source or a digital power source, depending on the needs of the structures of the liquid crystal displays.

In the liquid crystal displays according to the embodiment of the present invention, the constant current source is connected to at least one source driving circuits and at least one gate driving circuits, and the source driving circuits and the gate driving circuits are all connected through a screen wire. As such, current signals, instead of voltage signals, are transmitted between the source driving circuits and the gate driving circuits, such that the resistance of the screen wire may not affect the current signals, the current values of the current signals received by each of the source driving circuits and each of the gate driving circuits are equal. As the converter circuits convert the received current signals into voltage signals, it is ensured that there are no attenuations of the voltages provided to each of the source driving circuits and each of the gate driving circuits. It is thus possible to simplify the manufacturing processes without requiring to precisely control sizes of the screen wires.

Also, the converter circuit comprises a resistor; the manufacturing process is simplified with converting the current signals into voltage signals by using the resistor.

Furthermore, it is only to provide a converter circuit in each of the source driving circuits and each of the gate driving circuits to convert the constant current signals received into voltage signals, thereby simplifying the manufacturing processes without requiring to precisely control sizes of the screen wires.

In the liquid crystal displays according to the embodiments of the present invention, a constant current source is used to provide constant current signals to each of the source driving circuits and each of the gate driving circuits. The current values of the current signals received by each of the source driving circuits and each of the gate driving circuits can not be affected, despite of a long screen wire and thereby a relatively large voltage drop. As such, the performances of such liquid crystal displays are improved with no power increases and heat increases of the driving circuits due to long screen wires.

Also, the spaces occupied by the screen wires can be decreased as that the screen wires used to transmit constant current signals may occupy relatively smaller area.

It needs to mentioned at last that, the above embodiments are merely technical solutions according to the present invention, but shall not be construed to limit the application in any manner; despite of detailed descriptions referring to the previous embodiments, those skilled in the art should understand that modifications may be made to the technical solutions described in the previous embodiments or some of the features in the technical solutions may be substituted equivalently, without departing the spirit and scope of the present invention.

What is claimed is:

1. A chip-on-glass base type liquid crystal display, comprising:
   a glass substrate;
   two or more driving circuits provided on the glass substrate and connected to each other in series;
   a constant current source, connected to at least one of the two or more driving circuits to provide constant current signals to each of the driving circuits, and
   a converter circuit provided in each of the driving circuits to convert the constant current, signals received into voltage signals and output the voltage signals converted from the constant current signals to a gate line or a data line,
   wherein the constant current source is independent from the two or more driving circuits.

2. The chip-on-glass base type liquid crystal display according to claim 1, wherein the converter circuits provided in all the driving circuits are connected to each other in series.

3. The chip-on-glass base type liquid crystal display according to claim 1, wherein the driving circuits are source driving circuits.

4. The chip-on-glass base type liquid crystal display according to claim 3, wherein the two or more driving circuits form at least one first series circuit.

5. The chip-on-glass base type liquid crystal display according to claim 1, wherein the driving circuits are gate driving circuits.

6. The chip-on-glass base type liquid crystal display according to claim 5, wherein the two or more gate driving circuits form at least one second series circuit.

7. The chip-on-glass base type liquid crystal display according to claim 1, wherein the converter circuit comprises:
   an input terminal to receive the constant current signals;
   a resistor, one end of which is connected to the input terminal, and the other end is grounded; and
   an output terminal connected to the input terminal and the end of the resistor that is connected to the input terminal and for outputting the voltage signals.

8. The chip-on-glass base type liquid crystal display according to claim 7, wherein the driving circuits are source driving circuits.

9. The chip-on-glass base type liquid crystal display according to claim 8, wherein the two or more of the source driving circuits form at least one first series circuit, and
   in the at least one first series circuit, the input terminal of the converter circuit in the source driving circuit connected to the constant current source is connected to the constant current source; other than the source driving circuit connected to the constant current source, the input terminal of the converter circuit in each of the remaining source driving circuits is connected to the input terminal of the converter circuit in the previous adjacent gate driving circuit in the first series circuit.

10. The chip-on-glass base type liquid crystal display according to claim 7, wherein the driving circuits are gate driving circuits.

11. The chip-on-glass base type liquid crystal display according to claim 10, wherein the two or more gate driving circuits form at least one second series circuit, and
   in the at least one second series circuit, the input terminal of the converter circuit of the gate driving circuit connected to the constant current source is connected to the constant current source; other than the gate driving circuit connected to the constant current source, the input terminal of the converter circuit of each of the remaining source driving circuits is connected to the input terminal of the converter circuit in the previous adjacent gate driving circuit in the second series circuit.

12. The chip-on-glass base type liquid crystal display according to claim 7, wherein the current value of the constant current source equals to a sum of the ratios between the driving voltage of each of the driving circuits and the corresponding resistance of each of the driving circuits.

13. The chip-on-glass base type liquid crystal display according to claim 1, wherein the constant current source is connected to at least one of the driving circuits through a flexible circuit board.

14. The chip-on-glass base type liquid crystal display according to claim 13, wherein the flexible circuit board is connected to at least one of the driving circuits through anisotropic conductive adhesive.

15. The chip-on-glass base type liquid crystal display according to claim 1, wherein the constant current source is an analog power source or a digital power source.

16. The chip-on-glass base type liquid crystal display according to claim 1, wherein the constant current source is provided on a printed circuit board.

17. The chip-on-glass base type liquid crystal display according to claim 1, wherein the driving circuit is provided on the glass substrate by welding.

18. The chip-on-glass base type liquid crystal display according to claim 1, wherein the driving circuit is provided on the glass substrate with metal paste.

* * * * *